US009739931B2

(12) United States Patent
Kuromizu (10) Patent No.: US 9,739,931 B2
(45) Date of Patent: Aug. 22, 2017

(54) LIGHTING DEVICE AND DISPLAY APPARATUS

(71) Applicant: Sakai Display Products Corporation, Sakai-shi, Osaka (JP)

(72) Inventor: Yasumori Kuromizu, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/912,508

(22) PCT Filed: Aug. 22, 2013

(86) PCT No.: PCT/JP2013/072370
§ 371 (c)(1),
(2) Date: Feb. 17, 2016

(87) PCT Pub. No.: WO2015/025394
PCT Pub. Date: Feb. 26, 2015

(65) Prior Publication Data
US 2016/0202411 A1    Jul. 14, 2016

(51) Int. Cl.
*F21V 8/00*    (2006.01)
*G02B 6/00*    (2006.01)
(Continued)

(52) U.S. Cl.
CPC .............. *G02B 6/0088* (2013.01); *G02B 6/00* (2013.01); *G02B 6/0051* (2013.01); *G02F 1/133* (2013.01);
(Continued)

(58) Field of Classification Search
CPC .............................. G02B 6/0088; G02B 6/0051
See application file for complete search history.

(56) References Cited

U.S. PATENT DOCUMENTS 6,175,396 B1 *  1/2001  Kim ................. G02F 1/133308
349/58
6,835,961 B2 * 12/2004  Fukayama ........ G02F 1/133308
257/84
(Continued)

FOREIGN PATENT DOCUMENTS

JP    2002-311430 A    10/2002
JP    2004-086046 A     3/2004
(Continued)

*Primary Examiner* — Elmito Breval
(74) *Attorney, Agent, or Firm* — Rudy J. Ng; Bret E. Field; Bozicevic, Field & Francis LLP (57) ABSTRACT

Provided are a lighting device having improved workability of a loading operation of an optical sheet in the lighting device whose error of members is large, and a display apparatus including the lighting device. A lighting device, which includes a light guide plate 11, an optical sheet 15 configured to diffuse or collect light emitted from the light guide plate 11, and a housing part 13 in which the light guide plate 11 and the optical sheet 15 are laminated and housed, includes a plurality of holding parts (optical sheet holding parts 134) which are provided in the housing part (a back housing part 13) to support the optical sheet 15 in the housing part, wherein the optical sheet 15 has a plurality of hole parts (through holes 151*b*) formed therein corresponding to the holding parts, in which the holding parts penetrate, and cross sections of the plurality of holding parts parallel to the optical sheet 15 have areas smaller than the cross-sectional areas of the hole parts, and a difference between the cross-sectional areas of the hole parts and the areas of the cross sections of the holding parts is not constant.

12 Claims, 10 Drawing Sheets

(51) Int. Cl.
  *G02F 1/133*  (2006.01)
  *G02F 1/1335* (2006.01)
(52) U.S. Cl.
  CPC .. *G02F 1/133606* (2013.01); *G02F 1/133608* (2013.01); *G02F 2201/465* (2013.01); *G02F 2201/54* (2013.01)

(56) References Cited

U.S. PATENT DOCUMENTS

| | | | |
|---|---|---|---|
| 6,950,154 B2 * | 9/2005 | Lee | G02B 6/0088 |
| | | | 349/58 |
| 7,106,393 B2 * | 9/2006 | Lee | G02B 6/0088 |
| | | | 349/58 |
| 7,125,157 B2 * | 10/2006 | Fu | G02F 1/133608 |
| | | | 349/58 |
| 8,439,552 B2 * | 5/2013 | Jeong | G02B 6/0088 |
| | | | 349/58 |
| 2006/0007367 A1 * | 1/2006 | Cho | G02F 1/133308 |
| | | | 349/58 |
| 2006/0072343 A1 | 4/2006 | Shimizu | |
| 2013/0050991 A1 | 2/2013 | Kuroda | |

FOREIGN PATENT DOCUMENTS

| | | |
|---|---|---|
| JP | 2004-279864 A | 10/2004 |
| JP | 2013-130722 A | 7/2013 |
| WO | WO2011145355 A1 | 11/2011 |

\* cited by examiner

LIGHTING DEVICE AND DISPLAY APPARATUS

This application is the national phase under 35 U.S.C. §371 of PCT International Application No. PCT/JP2013/072370 which has an International filing date of Aug. 22, 2013 and designated the United States of America.

FIELD

The present invention relates to a lighting device which includes a light guide plate, an optical sheet for diffusing or collecting light emitted from the light guide plate, and a housing part in which the light guide plate and the optical sheet are laminated and housed, and a display apparatus including the lighting device.

BACKGROUND

Recently, a display apparatus such as a liquid crystal television has been widely distributed. A typical liquid crystal display apparatus among the display apparatuses includes a liquid crystal panel and a backlight (a lighting device). In the liquid crystal display apparatus, one surface of the liquid crystal panel is irradiated with light by the backlight, and an image is displayed on the other surface thereof. The backlight includes a light source unit, a rectangular plate-shaped light guide plate which propagates light from the light source unit inside thereof in a planar manner and emits the light from one surface thereof, a reflection sheet which is fixed to the other surface of the light guide plate, an optical sheet including a plurality of sheets which makes the light emitted from the light guide plate to have a more uniform luminance distribution, and a box-shaped backlight chassis whose one surface is opened. The backlight chassis houses the light source unit, the light guide plate, the reflection sheet and the optical sheet.

The optical sheet included in the backlight is fixed to the light guide plate. Fixation of the optical sheet is generally performed by engaging hole parts provided in a peripheral edge of the optical sheet with holding parts such as bosses provided near an edge side of a bottom of a housing part.

In addition, Japanese Patent Application Laid-Open No. 2002-311430 discloses a display apparatus including reflection sheets which are disposed on end faces of a light guide plate and have hook parts provided at portions beyond a light emitting main surface thereof, and another reflection sheet having lead-out parts, which are locked to the hook parts so as to fix the reflection sheet to the light guide plate.

SUMMARY

However, recently, with a size of the display apparatus becoming larger, outer dimensions of each member are increased. Since the entire apparatus size is increased, a dimension error is increased. In addition, the numbers of the hole parts provided in the optical sheet, and the holding parts corresponding thereto provided in the housing part are also increased.

On the other hand, due to narrowing of a frame, a cross-sectional area of the holding part is decreased. From the above-described tendency, a positional shift between the hole parts and the holding part is occurred, there is problem that a workability during attaching the optical sheet to the housing part is deteriorated.

In consideration of the above-described circumstances, it is an object of the present invention to provide a lighting device in which workability of an attaching operation of the optical sheet is improved even when a dimensional error is large, and a display apparatus including the lighting device.

The lighting device according to one embodiment of the present invention is characterized by a lighting device according to the present application includes a light guide plate, an optical sheet configured to diffuse or collect light emitted from the light guide plate, and a housing part in which the light guide plate and the optical sheet are laminated and housed. The lighting device comprises a plurality of holding parts which are provided in the housing part to support the optical sheet in the housing part, is characterized in that the optical sheet has a plurality of hole parts formed therein corresponding to the holding parts, in which the holding parts penetrate, cross sections of the plurality of holding parts parallel to the optical sheet have areas smaller than the cross-sectional areas of the hole parts, and a difference between the cross-sectional areas of the hole parts and the areas of the cross sections of the holding parts is not constant.

According to the embodiment of the present invention, since the difference between the cross-sectional areas of the hole parts and the areas of the cross sections of the holding parts is not constant, by sequentially penetrating the hole parts of the optical sheet from the holding part having a small difference, even if a positional shift between the hole parts and the holding parts due to a dimensional error occurs, it is possible to perform a loading of the optical sheet with excellent workability.

In the lighting device according to the embodiment of the present invention, it is preferred that some of the cross-sectional areas of the plurality of the holding parts include those that differ from the other cross-sectional area of the holding part.

According to the preferred embodiment of the present invention, since the cross-sectional area of the plurality of holding parts is not uniform, and a part of the holding parts has the area of cross section which is different from the areas of the cross sections of the other holding parts, by penetrating the hole parts of the optical sheet from the holding part having a large cross-sectional area, even if a positional shift between the hole parts and the holding parts occurs, it is possible to perform the loading of the optical sheet with excellent workability.

In the lighting device according to the embodiment of the present invention, cross sections of the holding parts may be rectangular shape.

According to the present embodiment, since the cross section of the holding part is a rectangular shape, that is, the holding part is the square column shape, it is possible to perform a molding process with a normal processing accuracy.

In the lighting device according to the embodiment of the present invention, a holding part having the largest area among the plurality of holding parts may have a rectangular cross section, and the other holding parts may have a triangular cross section.

According to the present embodiment, since the cross section of the holding parts other than the holding part having the largest cross-sectional area is a triangular shape, compared to the case of a rectangular shape, it is easy to penetrate the holding parts, and the workability may be more improved.

In the lighting device according to the embodiment of the present invention, the housing part may be formed in a box shape in which one surface thereof has an opening portion, and at least one side of the edge sides of a surface facing the opening portion is a linear shape, the plurality of holding parts may be provided along the linear edge side, and a holding part provided near a center of the edge side may have the largest cross-sectional area.

According to the present embodiment, the plurality of holding parts are arranged on a straight line, and the holding part near the center has the largest cross-sectional area. By passing the hole part located at the center among the hole parts of the optical sheet with the holding part, and then toward an outside, sequentially passing the hole parts with the holding parts, thereby it is possible to load the optical sheet, and thus it is possible to perform the loading of the optical sheet with excellent workability.

In the lighting device according to the embodiment of the present invention, the housing part may be formed in a box shape in which one surface thereof has an opening portion, and at least one side of the edge sides of a surface facing the opening portion is a linear shape, the plurality of holding parts may be provided along the linear edge side, and a holding part provided near one end of the edge side may have the largest cross-sectional area.

According to the present embodiment, the plurality of holding parts are arranged on the straight line, and the holding part located at the one end has the largest cross-sectional area. By passing the hole part located at the one end among the hole parts of the optical sheet with the holding part, and then toward the other end, sequentially passing the hole parts with the holding parts, thereby it is possible to load the optical sheet, and thus it is possible to perform the loading of the optical sheet with excellent workability.

In the lighting device according to the embodiment of the present invention, some of the cross-sectional areas of the hole parts may include those that differ from the other cross-sectional area of the hole part.

According to the present embodiment, since the cross-sectional area of the hole parts is not uniform, and a part of the hole parts has the cross-sectional area which is different from the cross-sectional areas of the other hole parts, by penetrating the hole parts with the holding parts from the hole part having a small cross-sectional area, even if a positional shift between the hole parts and the holding parts due to a dimensional error occurs, it is possible to perform the loading of the optical sheet with excellent workability.

In the lighting device according to the embodiment of the present invention, the housing part may be formed in a box shape in which one surface thereof has an opening portion, and at least one side of the edge sides of a surface facing the opening portion is a linear shape, the plurality of holding parts may be provided along the linear edge side, and a hole part corresponding to the holding part provided near the center of the edge side may have the smallest cross-sectional area.

According to the present embodiment, the plurality of holding parts are arranged on the straight line, and the hole parts corresponding thereto are also formed so as to be arranged on the straight line. In addition, the hole part corresponding to the holding part provided near the center has the smallest cross-sectional area. Passing the hole part located at the center with the holding part, and then toward the outside, sequentially passing the hole parts with the holding parts, thereby it is possible to load the optical sheet, and thus it is possible to perform the loading of the optical sheet with excellent workability.

In the lighting device according to the embodiment of the present invention, the housing part may be formed in a box shape in which one surface thereof has an opening portion, and at least one side of the edge sides of a surface facing the opening portion is a linear shape, the plurality of holding parts may be provided along the linear edge side, and a hole part corresponding to the holding part provided near the one end of the edge side may have the smallest cross-sectional area.

According to the present embodiment, the plurality of holding parts are arranged on the straight line, and the hole parts corresponding thereto are also formed so as to be arranged on the straight line. In addition, the hole part corresponding to the holding part provided at the one end has the smallest cross-sectional area. Passing the hole part located at the one end with the holding part, and then toward the other end, passing the hole parts with the holding parts, thereby it is possible to load the optical sheet, and thus it is possible to load the optical sheet with excellent workability.

In the lighting device according to the embodiment of the present invention, the housing part may be formed in a box shape in which one surface thereof has an opening portion, and at least one side of the edge sides of a surface facing the opening portion is a linear shape, the plurality of holding parts may be provided along the linear edge side, and a difference between the cross-sectional area of the hole part corresponding to the holding part provided near the center of the edge side and the areas of the cross sections of the holding parts may be smallest.

According to the present embodiment, the plurality of holding parts are arranged on the straight line, and the hole parts corresponding thereto are also formed so as to be arranged on the straight line. In addition, a difference between the cross-sectional area of the hole part corresponding to the holding part provided near the center and the area of the cross section of the holding part is minimized. Passing the hole part located at the center with the holding part, and then toward the outside, sequentially passing the hole parts with the holding parts, thereby it is possible to load the optical sheet, and thus it is possible to perform the loading of the optical sheet with excellent workability.

In the lighting device according to the embodiment of the present invention, the housing part may be formed in a box shape in which one surface thereof has an opening portion, and at least one side of the edge sides of a surface facing the opening portion is a linear shape, the plurality of holding parts may be provided along the linear edge side, and a difference between the cross-sectional area of the hole part corresponding to the holding part provided near the one end of the edge side and the areas of the cross sections of the holding parts may be smallest.

According to the present embodiment, the plurality of holding parts are arranged on the straight line, and the hole parts corresponding thereto are also formed so as to be arranged on the straight line. In addition, a difference between the cross-sectional area of the hole part corresponding to the holding part provided at the one end and the area of the cross section of the holding part is minimized. Passing the hole part located at the one end with the holding part, and then toward the other end, sequentially passing the hole parts with the holding parts, thereby it is possible to load the optical sheet, and thus it is possible to load the optical sheet with excellent workability.

The display apparatus to one embodiment of the present invention is characterized by a display apparatus including the lighting device according to the description above and a display panel which faces the one surface of the light guide plate, and displays an image using light which enter through the light guide plate.

According to the embodiment of the present invention, by penetrating the hole parts of the optical sheet from the holding part having a large cross-sectional area, even if a positional shift between the hole parts and the holding parts occurs, it is possible to perform the loading of the optical sheet with excellent workability.

Advantageous Effects

According to the present invention, even if the dimensional error of each member is large, it is possible to load the optical sheet on the light guide plate with good workability.

DESCRIPTION OF EMBODIMENTS

Hereinafter, a case in which a lighting device according to the embodiments of the present invention is applied to a so-called liquid crystal display apparatus including a liquid crystal display panel will be described in detail, by way of example, with reference to the accompanying drawings.

Embodiment 1

Figure 1:
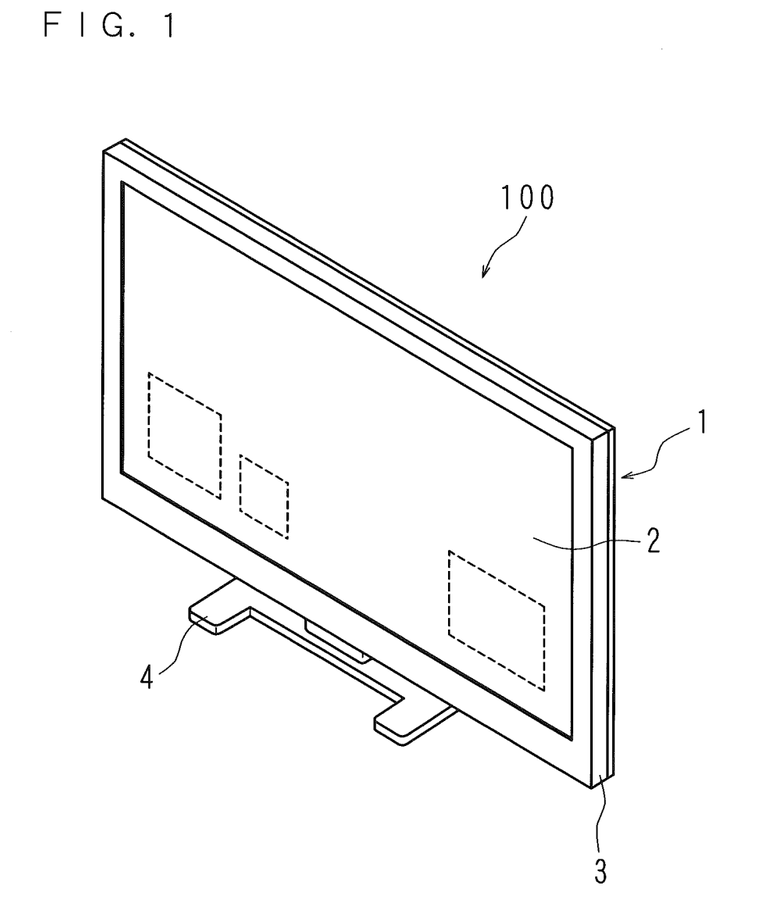
FIG. 1 is a perspective view illustrating an appearance of a liquid crystal display apparatus according to Embodiment 1 of the present invention.

FIG. 1 is a perspective view illustrating an appearance of a liquid crystal display apparatus 100 according to Embodiment 1 of the present invention. The liquid crystal display apparatus 100 includes a liquid crystal display panel 2, a backlight (the lighting device) 1, a front housing part 3 and a stand 4. The stand 4 is a member for placing the liquid crystal display apparatus 100 on a plane such as a table by erecting the same.

Figure 2:
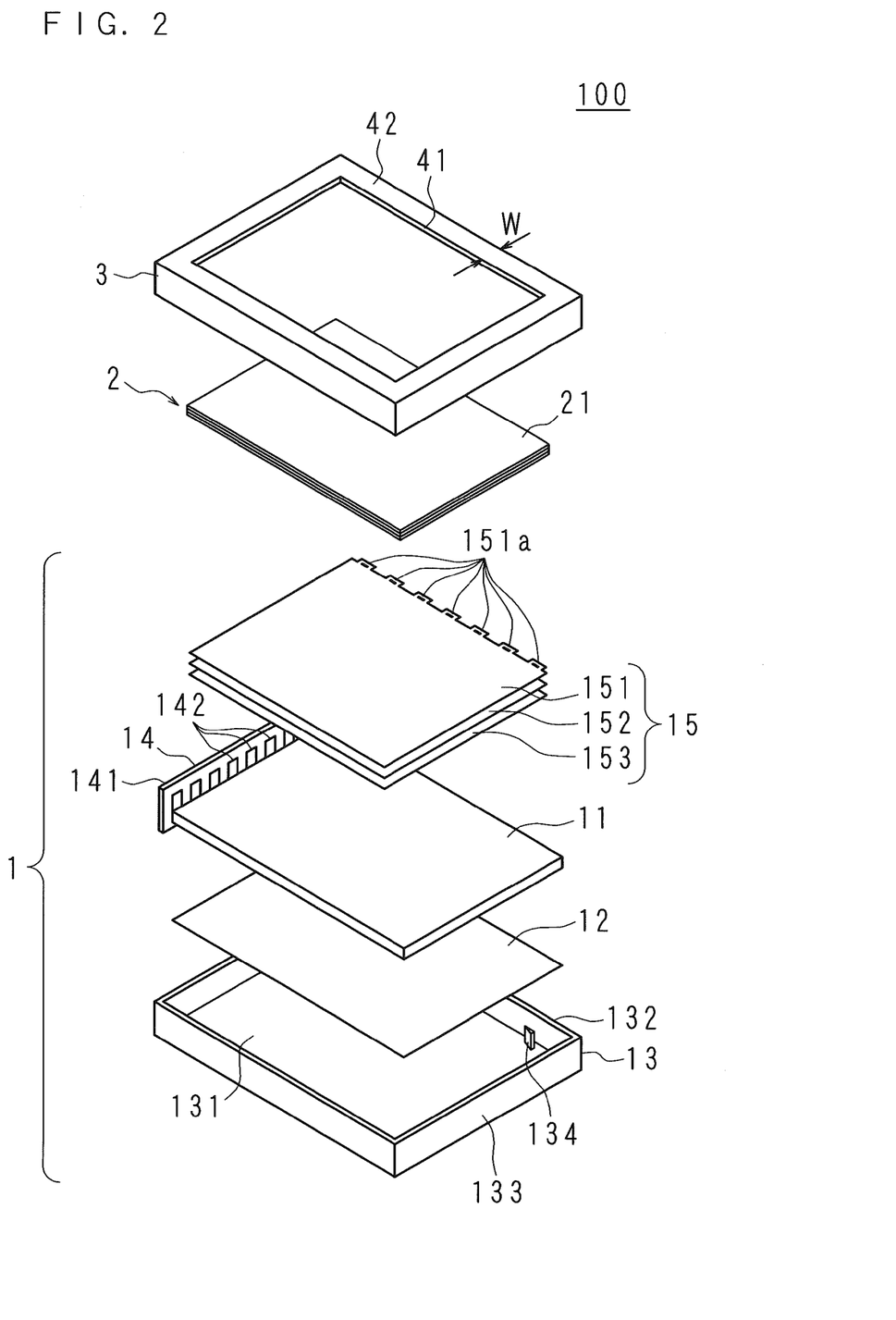
FIG. 2 is an exploded perspective view illustrating a configuration of the liquid crystal display apparatus according to Embodiment 1 of the present invention.

FIG. 2 is an exploded perspective view illustrating a configuration of the liquid crystal display apparatus 100 according to Embodiment 1 of the present invention. The stand 4 is not illustrated therein.

The front housing part 3 is a rectangular plate-shaped frame body. The front housing part 3 includes an opening portion 41, and a frame portion 42. The backlight 1 irradiates the liquid crystal display panel (a display panel) 2 with light. The liquid crystal display panel 2 is formed in a rectangular plate shape. The liquid crystal display panel 2 receives the light of the backlight 1 from a back surface side to display an image on a front side thereof. The front housing part 3 covers a peripheral edge of the liquid crystal display panel 2 from the front side.

The backlight 1 includes a light guide plate 11, a reflection sheet 12, a back housing part (a housing part) 13, a light source unit 14 and an optical sheet 15. The back housing part 13 is formed in a box shape having an opening portion on one surface thereof. A bottom 131 forming a surface facing the opening portion is formed in a rectangular shape.

The light guide plate 11 is made of a rectangular high transparency acrylic resin, for example, and has a prescribed thickness. The light guide plate 11 converts the light entering from a side face into flat light to emit it from a wide surface thereof.

The reflection sheet 12 is a rectangular sheet. The reflection sheet 12 irregularly reflects the light entering from an outside. The reflection sheet 12 has substantially the same dimension as the light guide plate 11.

The light source unit 14 has a substrate 141, and light sources 142, 142, . . . and 142 juxtaposed on the substrate 141. The light sources 142, 142, . . . and 142 are, for example, a light emitting diode (LED). The light source unit 14 may be formed by using, for example, an electric bulb, hot-cathode fluorescent lamp, electro luminescence (EL) lamp, or cold-cathode tube or the like.

The position of the light source unit 14 is not limited to near the one side face of the light guide plate 11, and may be provided near the other side face of a short side, or near the side face of a long side. Further, the light source unit 14 may be configured to be provided at a plurality of places, not only one place.

The optical sheet 15 is a sheet which functions to diffuse and collect, etc. the light. For example, the optical sheet 15 is formed of a plurality of laminated sheets, and includes a first diffusion sheet 151, a second diffusion sheet 153, and a prism sheet 152 disposed between the first diffusion sheet 151 and the second diffusion sheet 153.

In the backlight 1, as illustrated in FIG. 2, the reflection sheet 12, the light guide plate 11 and the optical sheet 15 are sequentially loaded and housed in the back housing part 13, and the light source unit 14 is disposed so that the light sources 142, 142 and . . . juxtaposed on the substrate 141 face the one side face of the light guide plate 11.

Further, the liquid crystal display panel 2 is overlapped on the light guide plate 11. Furthermore, the front housing part 3 is fixed to the back housing part 13 so as to cover the peripheral edge part of a display surface 21 of the liquid crystal display panel 2, and thereby the liquid crystal display apparatus 100 is assembled.

The liquid crystal display apparatus 100 configured as described above displays an image on the display surface 21 of the liquid crystal display panel 2 by the following operation. Light emitted from light sources 142, 142 and . . . of the light source unit 14 is entered from the one side face of the light guide plate 11 facing these light sources in the light guide plate 11. The light entering into the light guide plate 11 is irregularly reflected by patterns formed inside of the light guide plate 11, and emitted from the wide surface facing the optical sheet 15. A part of the light entering into the light guide plate 11 is totally reflected by the reflection sheet 12 facing the back housing part 13 side, and emitted from the wide surface facing the optical sheet 15.

The light emitted from the light guide plate 11 is diffused by the second diffusion sheet 153, and is entered into the prism sheet 152. The prism sheet 152 collects the light which entered, and emits the collected light to the liquid crystal display panel 2. The light emitted from the prism sheet 152 is entered into the first diffusion sheet 151 perpendicular to the prism sheet 152. The first diffusion sheet 151 further diffuses the light entered from the prism sheet 152 to provide a more uniform luminance distribution, and emits the light to the liquid crystal display panel 2.

The light which enters into the liquid crystal display panel 2 from the first diffusion sheet 151 is controlled by liquid crystal included in the liquid crystal display panel 2, and the image is formed on the display surface 21. Further, a polarizing plate (not illustrated) is provided between the liquid crystal display panel 2 and the optical sheet 15.

Figure 3:
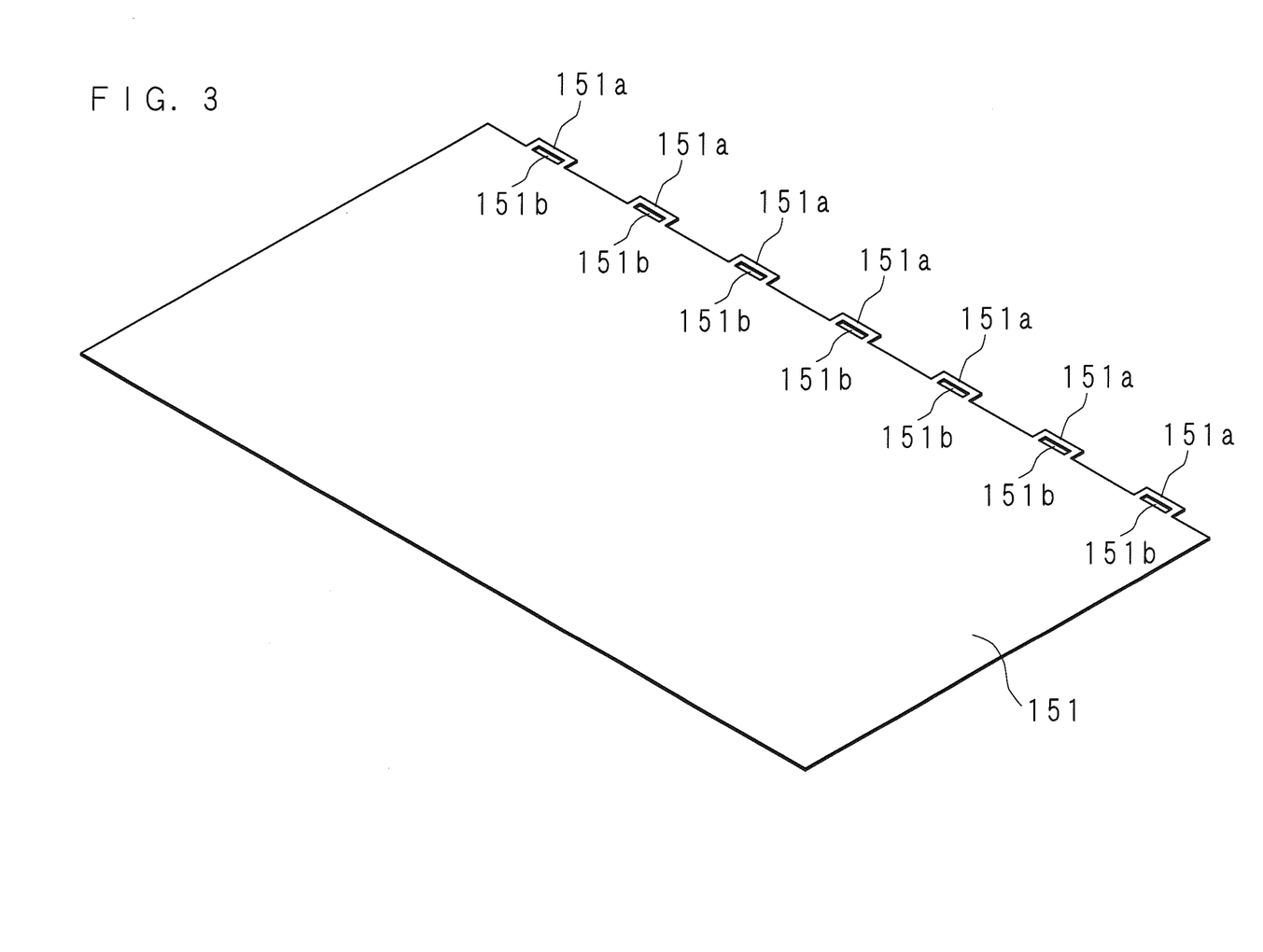
FIG. 3 is a perspective view illustrating one example of the first diffusion sheet.

Next, the optical sheet 15 will be described in more detail. FIG. 3 is a perspective view illustrating one example of the first diffusion sheet 151. In the following description, the first diffusion sheet 151 will be mainly described, but the second diffusion sheet 153 and the prism sheet 152 are the same as the first diffusion sheet 151. The first diffusion sheet 151 is a rectangular sheet. The first diffusion sheet 151 is provided with a plurality of ear parts 151a on one long side edge (one side edge in a long side direction) thereof. The ear parts 151a are provided along the one long side (side edge) at a prescribed interval, and overhang to an outside. The ear parts 151a are a rectangular shape, and have a long side parallel to the long side direction of the first diffusion sheet 151. Each ear part 151a has a rectangular through hole 151b respectively formed therein.

In the example illustrated in FIG. 3, seven ear parts 151a are provided, but this is only one possible example. An outer dimension and juxtaposed interval of the ear parts 151a may be appropriately designed based on the outer dimension of the first diffusion sheet 151.

Figure 4:
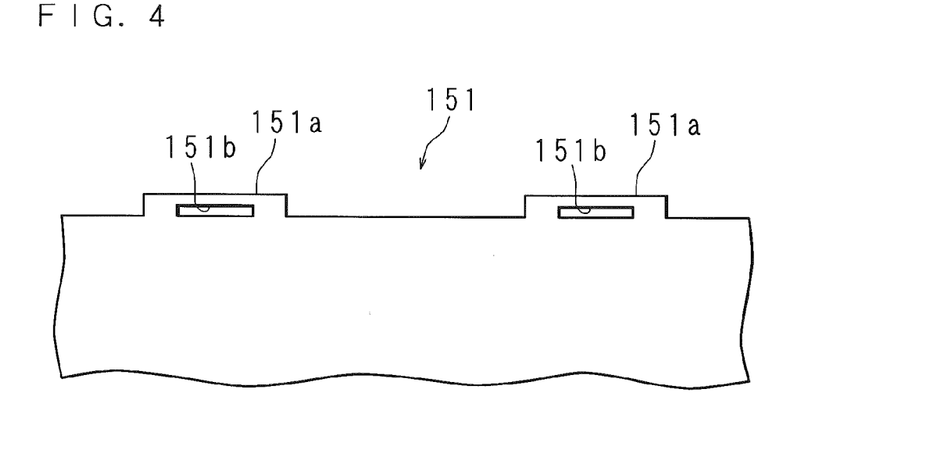
FIG. 4 is a plan view in which a portion of the first diffusion sheet is enlarged.

FIG. 4 is a plan view in which a portion of the first diffusion sheet 151 is enlarged. The through hole 151b is centered in the ear part 151a along the long side direction thereof. The through holes 151b are aligned to be substantially lower than the ear parts 151a along a short side direction. An aspect of the through hole 151b illustrated in FIG. 4 is only one possible example. The dimension of the through hole 151b and forming position thereof in the ear parts 151a may be appropriately designed based on the outer dimension of the ear parts 151a.

Figure 5:
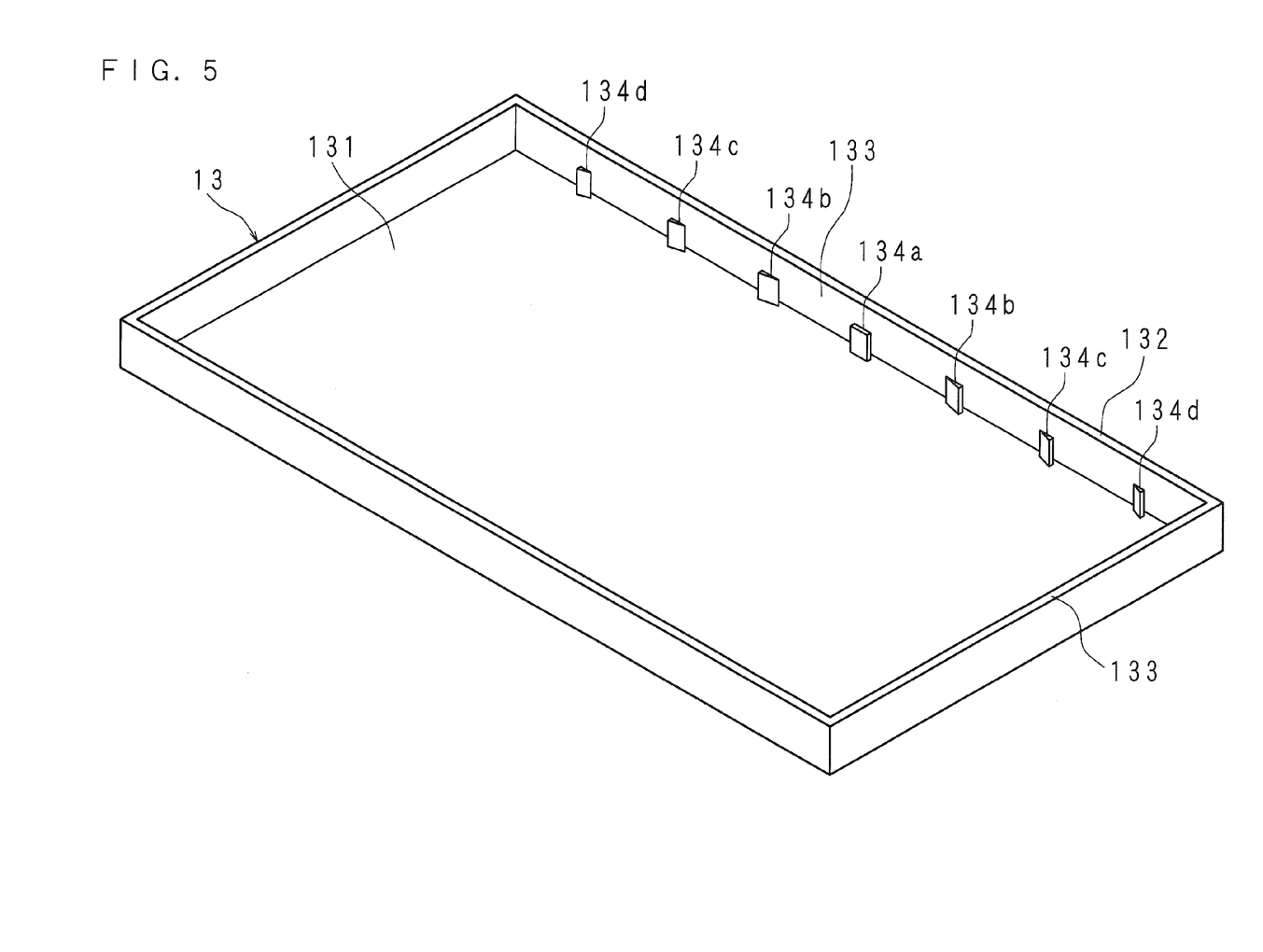
FIG. 5 is a perspective view illustrating one example of the back housing part.
Figure 6:
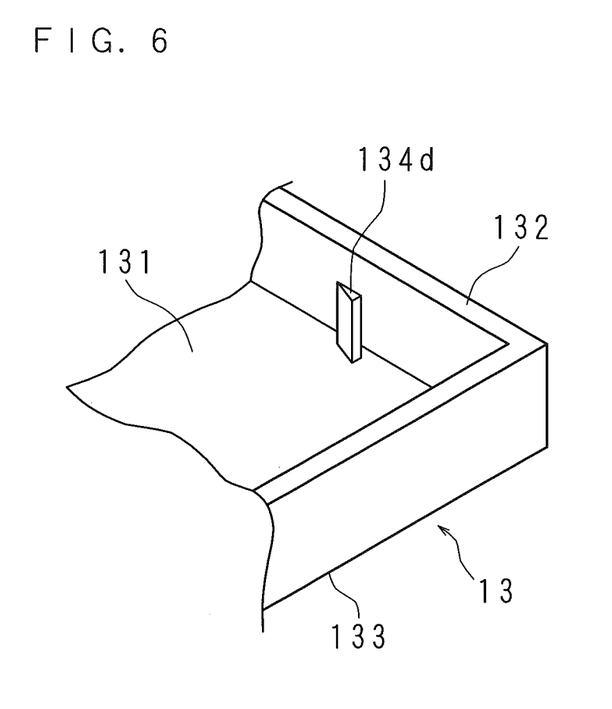
FIG. 6 is a partial enlarged perspective view of the back housing part.

FIG. 5 is a perspective view illustrating one example of the back housing part 13. FIG. 6 is a partial enlarged perspective view of the back housing part 13. The bottom 131 is provided with a plurality of optical sheet holding parts (holding parts) 134a to 134d at a prescribed interval along one linear edge side thereof. The optical sheet holding part 134a is located at a center (a center of the edge side) in a direction along a side wall 132. The optical sheet holding part 134a stands substantially vertically from the bottom 131. The optical sheet holding part 134a is formed in a square column shape. That is, the optical sheet holding part 134a has a rectangular cross section. The optical sheet holding part 134a is formed at a prescribed distance from the longitudinal side wall 132 in the long side direction.

The optical sheet holding parts 134b are formed on the outer side of the optical sheet holding part 134a. Further, the optical sheet holding parts 134c are formed on the outer side of the optical sheet holding parts 134b. Furthermore, the optical sheet holding parts 134d are formed on the outer side of the optical sheet holding parts 134c.

The optical sheet holding parts 134b to 134d are formed so as to stand substantially vertically from the bottom 131 similarly to the optical sheet holding part 134a. The optical sheet holding parts 134b to 134d are formed in a triangular column shape. That is, the optical sheet holding parts 134b to 134d have a triangular cross section.

Figure 7:
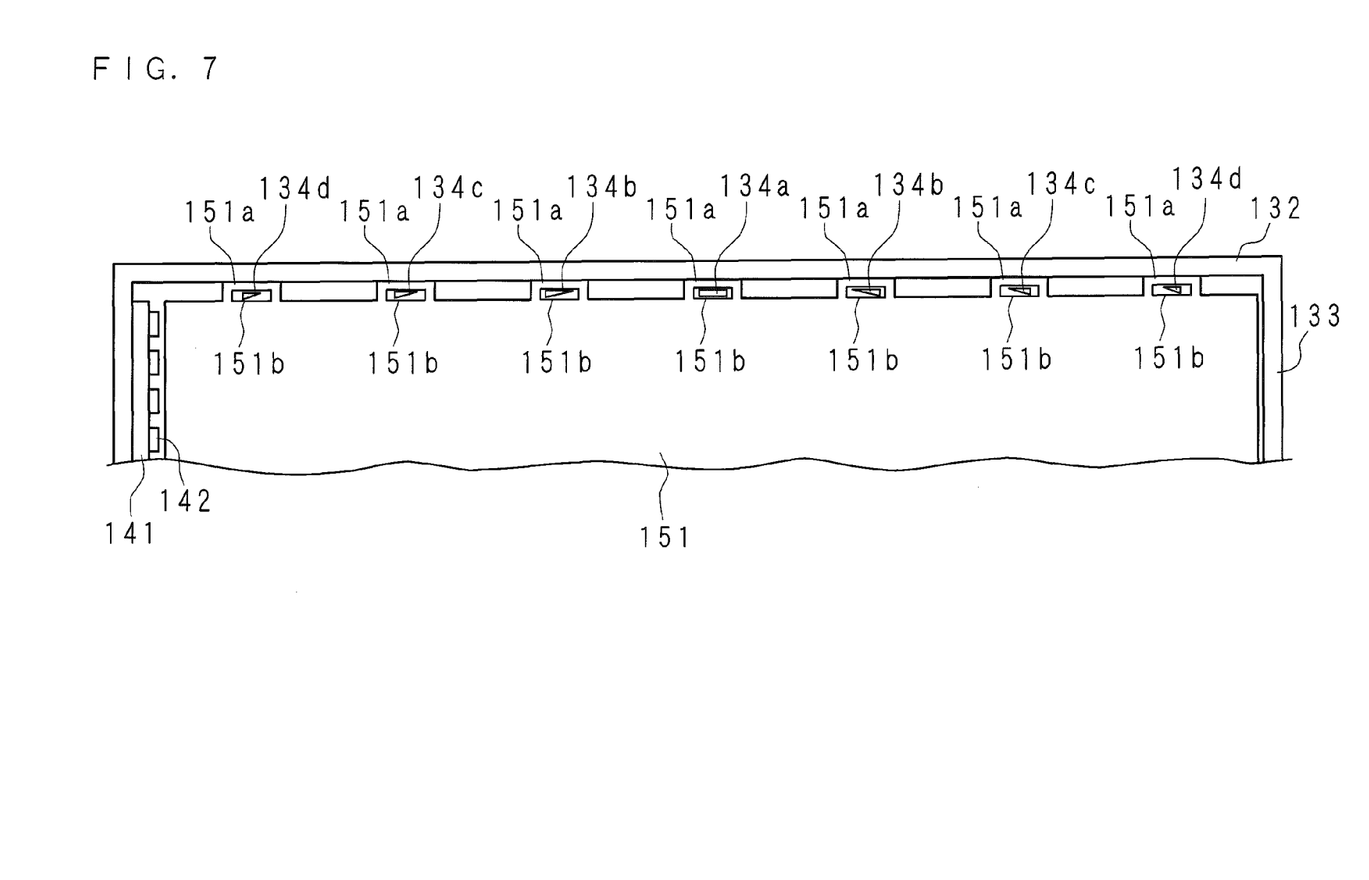
FIG. 7 is a partial plan view for describing a state in which the first diffusion sheet is assembled.

FIG. 7 is a partial plan view for describing a state in which the first diffusion sheet 151 is assembled. The through hole 151b provided in each ear part 151a is engaged with the optical sheet holding part 134a, 134b, 134c or 134d provided in the back housing part 13. Thereby, the first diffusion sheet 151 is held in the back housing part 13.

The optical sheet holding parts 134b to 134d have a right-angled triangular cross section. One long side of two sides forming a right angle faces the side wall 132 and is aligned therewith. That is, a distance between the side wall 132 becomes a constant distance. These sides are aligned with the side which constitutes the rectangular cross section of the optical sheet holding part 134a and faces the side wall 132. That is, the sides which constitute the cross-sectional figure of the optical sheet holding parts 134a to 134d and face the side wall 132 are arranged on one straight line.

The other side of the two sides forming the right angle faces a side wall 133 orthogonal to the side wall 132. An inclined side of the right-angled triangle to be the cross section of the optical sheet holding parts 134b to 134d is located on an inner side of the backlight 1.

The two optical sheet holding parts 134b with the optical sheet holding part 134a interposed therebetween have cross-sectional shapes which are line symmetry to each other. One side which constitutes the cross section of the optical sheet holding part 134b and forms the right angle of the right-angled triangle facing the side wall 133 is located on a side separated from the optical sheet holding part 134a. The optical sheet holding part 134b is formed so that the smallest internal angle among the angles of right-angled triangle is closest to the optical sheet holding part 134a. The right-angled triangular optical sheet holding parts 134c and 134d are the same as the optical sheet holding part 134b.

Figure 8A:
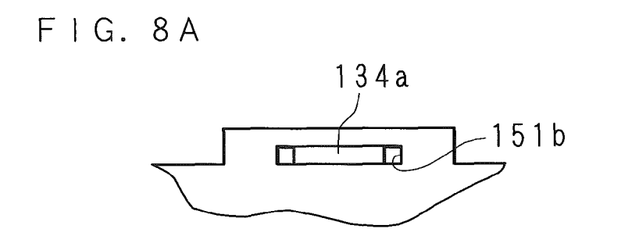
FIG. 8A is an explanatory view for describing the shape of the optical sheet holding part.
Figure 8B:
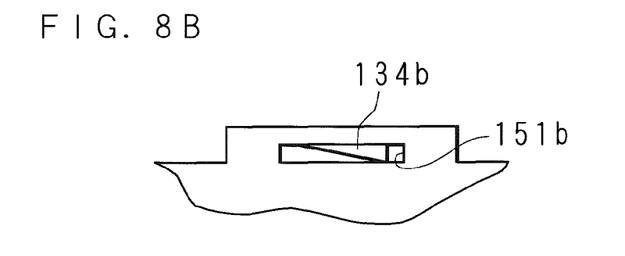
FIG. 8B is an explanatory view for describing the shape of the optical sheet holding part.
Figure 8C:
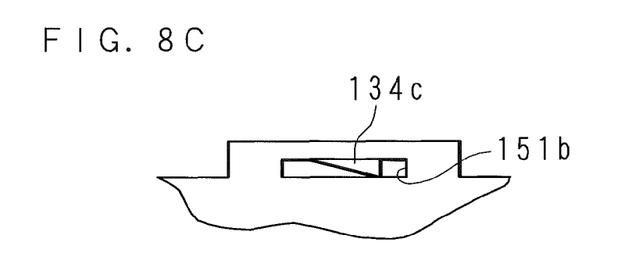
FIG. 8C is an explanatory view for describing the shape of the optical sheet holding part.
Figure 8D:
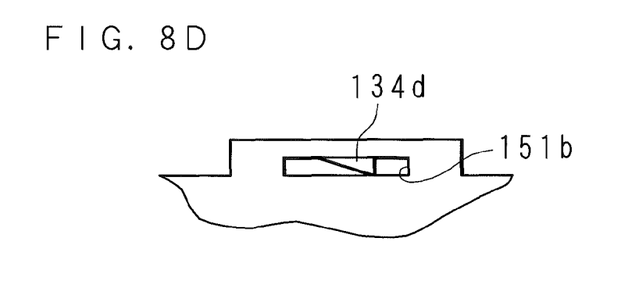
FIG. 8D is an explanatory view for describing the shape of the optical sheet holding part.

FIG. 8A is an explanatory view for describing the shape of the optical sheet holding part 134a. FIG. 8B is an explanatory view for describing the shape of the optical sheet holding part 134b. FIG. 8C is an explanatory view for describing the shape of the optical sheet holding part 134c. FIG. 8D is an explanatory view for describing the shape of the optical sheet holding part 134d. FIGS. 8A to 8D are plan views illustrating only the through hole 151b and each optical sheet holding part 134.

As illustrated in FIG. 8A, the optical sheet holding part 134a is formed in a rectangular shape in a plan view. That is, the cross section parallel to the first diffusion sheet 151 (optical sheet 15) is a rectangular shape. The entirety of the optical sheet holding part 134a is formed in a square column shape.

As illustrated in FIGS. 8B, 8C and 8D, the optical sheet holding parts 134b, 134c and 134d are formed in a triangular shape in a plan view. That is the cross section parallel to the first diffusion sheet 151 (optical sheet 15) is a triangular shape. The entirety of the optical sheet holding parts 134b, 134c and 134d are formed in a triangular column shape. These holding parts have different cross-sectional areas from each other, wherein the optical sheet holding part 134b has the largest cross-sectional area, the next is the optical sheet holding part 134c, and the optical sheet holding part 134d has the smallest cross-sectional area. The optical sheet holding part 134a has a cross-sectional area larger than that of the optical sheet holding part 134b.

When assembling the first diffusion sheet 151 in the back housing part 13, the operation is performed so that each ear part 151a is sequentially engaged to the through hole 151b corresponding thereto. The optical sheet holding part 134a penetrates, among the through holes 151b, the through hole 151b located at substantially the center of the first diffusion sheet 151 in the long side direction thereof to be engaged thereto. Next, the optical sheet holding parts 134b are engaged to the through holes 151b which are located at right and left of the through hole 151b. The next is the same as the above. That is, the optical sheet holding part 134a, etc. sequentially penetrates the through holes 151b from the center of the first diffusion sheet 151 in the long side direction thereof to the right and left peripheral edge directions.

As described above, the optical sheet holding part 134a has the largest cross-sectional area, and the optical sheet holding parts 134b, 134c and 134d have cross-sectional areas decreased in this order. All the through holes 151b formed in the first diffusion sheet 151 have the same dimension as each other. Therefore, with the cross-sectional area of the optical sheet holding parts 134 being smaller, the through holes 151b may be easily engaged. In addition, with the cross-sectional area of the optical sheet holding parts 134 being smaller, an allowable range of the positional shift between the optical sheet holding part 134 and the through hole 151b becomes wider.

Since the surfaces of the optical sheet holding parts 134a to 134d facing the side wall 132 are aligned with each other, it is possible to reliably position the first diffusion sheet 151. The optical sheet holding parts 134b to 134d having the right-angled triangular column shape are formed so that the smallest internal angles among the angles of the right-angled triangle are closest to the optical sheet holding part 134a. Therefore, after the ear part 151a is engaged to the optical sheet holding part 134a corresponding thereto, the ear parts 151a may be easily engaged to the optical sheet holding parts 134b.

Accordingly, even when a positional shift between the optical sheet holding parts 134a to 134d and the through holes 151b respectively corresponding thereto occurs, it is possible to assemble the first diffusion sheet 151 in the back housing part 13 without decreasing workability.

Embodiment 2

In Embodiment 1, the optical sheet holding part 134a having the largest cross-sectional area in a plan view is the rectangular shape, and the other optical sheet holding parts 134b to 134d have the triangular shape, but it is not limited thereto. In Embodiment 2, all the optical sheet holding parts are formed in a rectangular shape in a plan view. In Embodiment 2, the shape of the optical sheet holding part is different from Embodiment 1, and the other configurations are the same as Embodiment 1. Hereinafter, the difference from Embodiment 1 will be mainly described.

Figure 9A:
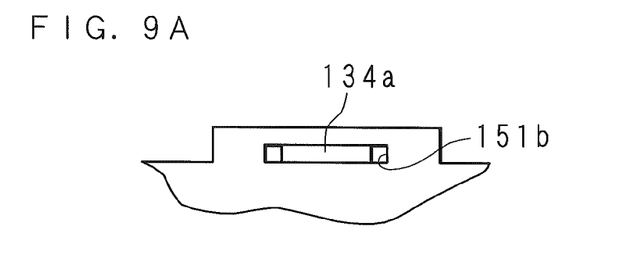
FIG. 9A is an explanatory view for describing the shape of an optical sheet holding part.
Figure 9B:
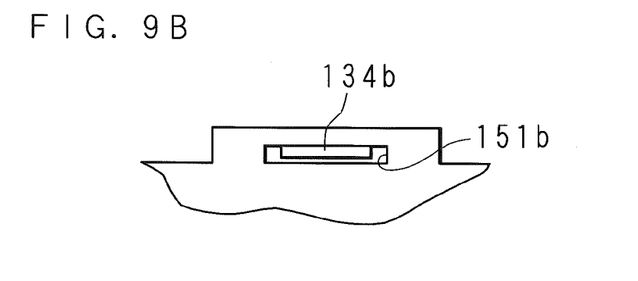
FIG. 9B is an explanatory view for describing the shape of an optical sheet holding part.
Figure 9C:
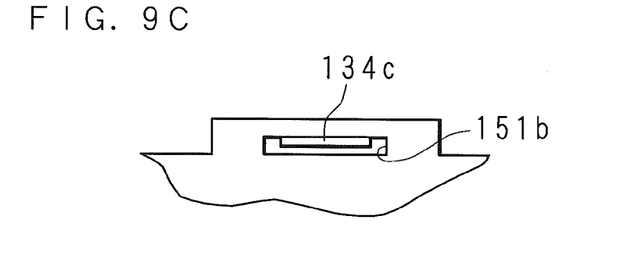
FIG. 9C is an explanatory view for describing the shape of an optical sheet holding part.
Figure 9D:
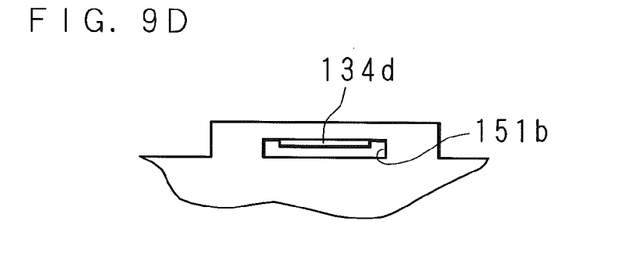
FIG. 9D is an explanatory view for describing the shape of an optical sheet holding part.

FIG. 9A is an explanatory view for describing the shape of an optical sheet holding part 134a. FIG. 9B is an explanatory view for describing the shape of an optical sheet holding part 134b. FIG. 9C is an explanatory view for describing the shape of an optical sheet holding part 134c. FIG. 9D is an explanatory view for describing the shape of an optical sheet holding part 134d. FIGS. 9A to 9D are plan views illustrating only the through hole 151b and each optical sheet holding part 134, similarly to FIGS. 8A to 8D.

As illustrated in FIG. 9A to 9D, in Embodiment 2, the shape of the optical sheet holding parts 134a to 134d in a plan view is a rectangular shape. However, these holding parts have different cross-sectional areas from each other, wherein the optical sheet holding part 134a has the largest cross-sectional area, and the optical sheet holding part 134d has the smallest cross-sectional area. Each one surface of the optical sheet holding parts 134a to 134d are aligned with each other, similarly to Embodiment 1. That is, the optical sheet holding parts 134a to 134d illustrated in FIG. 9 are configured so that each one side of the square long sides which constitutes the cross section thereof are arranged on one straight line.

The above-described optical sheet holding parts 134a to 134d are formed in the back housing part 13 similarly to Embodiment 1. That is, the optical sheet holding parts 134a to 134d are formed at the positions similar to Embodiment 1.

The optical sheet holding parts 134a to 134d according to Embodiment 2 are different from Embodiment 1 in terms of the cross section shape, but a relation of the cross-sectional area therebetween is the same as each other. Thereby, the same effects as Embodiment 1 may be produced.

When forming bosses such as the optical sheet holding parts 134a to 134d, the square column shape has molding processability higher than the triangular column shape. Thereby, in addition to the effects produced in Embodiment 1, Embodiment 2 produces an effect that the molding processability of the optical sheet holding parts 134a to 134d is increased, by forming the shape of the optical sheet holding parts 134a to 134d in a rectangular shape in a plan view.

Embodiment 3

In Embodiment 1, the through holes 151b sequentially penetrate from the optical sheet holding part 134a located near the center to the outside. In Embodiment 3, the through holes penetrate from one end to the other end. Hereinafter, the difference from Embodiment 1 will be mainly described.

Figure 10:
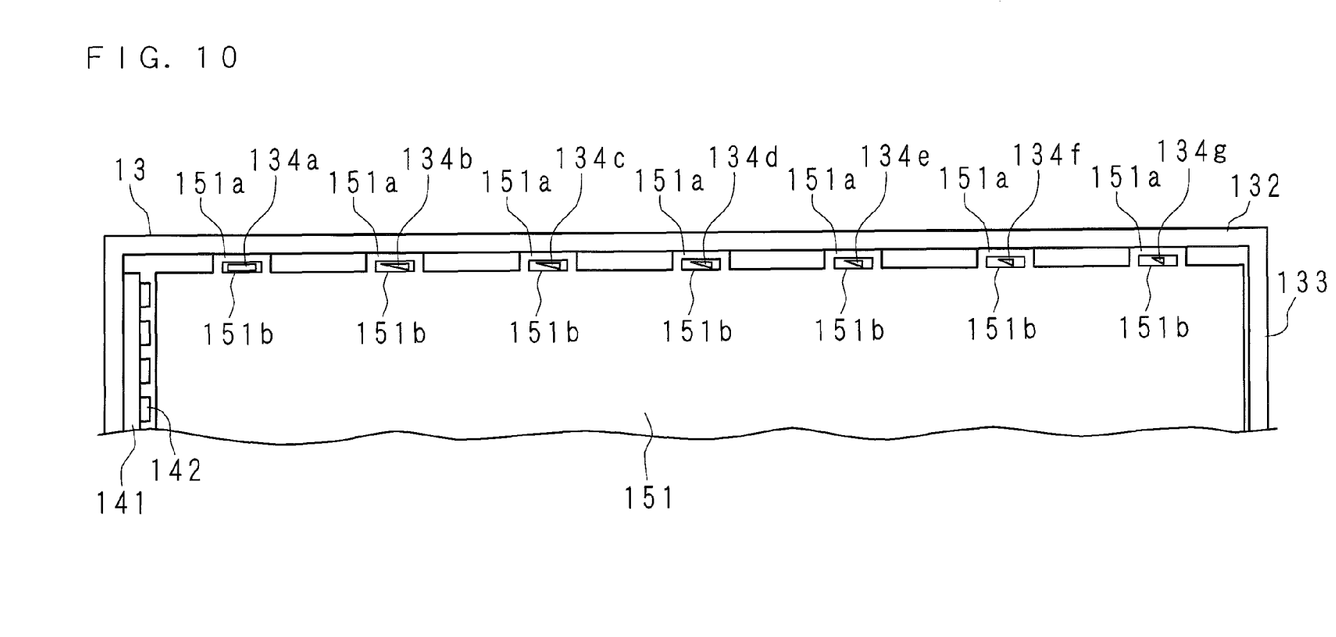
FIG. 10 is a partial plan view for describing a state in which the first diffusion sheet is assembled.

FIG. 10 is a partial plan view for describing a state in which the first diffusion sheet 151 is assembled. As illustrated in FIG. 10, all the alphabetical letters denoted to the respective optical sheet holding parts are different from each other. That is, it means that all the optical sheet holding parts 134a to 134g are differently formed from each other. In FIG. 10, the optical sheet holding part 134a located at the most left has a cross section of a rectangular shape. Briefly, the optical sheet holding part 134a is formed in a square column shape as a whole. Six optical sheet holding parts 134b to 134g other than the optical sheet holding part 134a have a cross section of a triangular column shape. Briefly, the optical sheet holding parts 134b to 134g are formed in a triangular column shape as a whole. The areas of the cross section of triangular shape of the respective optical sheet holding parts 134b to 134g are different from each other. The optical sheet holding part 134b has the largest cross-sectional area, and the cross-sectional areas thereof are decreased toward the right in FIG. 10. The optical sheet holding part 134g has the smallest cross-sectional area. In addition, the optical sheet holding part 134b has a smaller cross-sectional area than the optical sheet holding part 134a.

The optical sheet holding parts 134b to 134g have a right-angled triangle shape similar to Embodiment 1. The long sides of two sides forming the right angle of the right-angled triangle in these holding parts 134b to 134g are aligned with each other. The optical sheet holding parts 134b to 134g are formed so that the smallest internal angles among the angles of right-angled triangle are closest to the optical sheet holding part 134a.

The optical sheet holding parts penetrate the through holes 151b provided in the ear parts 151a of the first diffusion sheet 151 from the left to the right in FIG. 10. Positioning of the first diffusion sheet 151 is performed at one end of the side in which the ear parts 151a are formed on the optical sheet holding part side.

If each optical sheet holding part penetrates the through hole 151b corresponding thereto in the above-described order, the optical sheet holding part 134a having the largest cross-sectional area firstly penetrates the through hole 151b, and the optical sheet holding part 134g having the smallest cross-sectional area lastly penetrates the through hole 151b.

In addition to the effects produced in Embodiment 1, Embodiment 3 produces an effect as follow. Even when positioning the optical sheet at one end part, since the areas of the optical sheet holding parts are decreased toward the other end, the workability of a loading operation of the optical sheet is improved.

In the above-described Embodiments 1 and 3, the cross-sectional areas of the through holes 151b provided in the first diffusion sheet 151 are constant, and the cross-sectional area of each optical sheet holding part is changed, but it is not limited thereto. The cross-sectional areas of the optical sheet holding parts 134a to 134g may be constant, and the cross-sectional areas of the through holes 151b may be changed. In addition, the cross-sectional areas of both of the optical sheet holding parts 134a to 134g and the through holes 151b may be changed.

As a modified example of Embodiment 1, the following configuration may be considered. In FIG. 5, the optical sheet holding part 134a has the largest cross-sectional area, and the optical sheet holding part 134d has the smallest cross-sectional area. The optical sheet holding part 134a is the square column shape, and the optical sheet holding parts 134b to 134d are the triangular column shape.

Herein, the optical sheet holding parts 134a and 134b are formed in the same shape and dimension as the Embodiment 1. The optical sheet holding parts 134c and 134d are formed in substantially the same dimension as the optical sheet holding part 134b. In addition, the through holes 151b corresponding to the optical sheet holding part 134a and the optical sheet holding part 134b are formed to have the smallest cross-sectional area. Further, the through hole 151b corresponding to the optical sheet holding part 134c is formed to have a cross-sectional area slightly larger than the smallest cross-sectional area. The through hole 151b corresponding to the optical sheet holding part 134d is formed to have a cross-sectional area larger than the same.

By configuring as described above, even when the optical sheet holding parts 134b to 134d have substantially the same cross-sectional area as each other, the through holes 151b corresponding thereto have cross-sectional areas increased in an engaging sequence, such that even if the dimensional error is large, it is possible to easily assemble the first diffusion sheet 151.

As a modified example of Embodiment 2, the following configuration may be considered. In FIG. 9, the optical sheet holding part 134a is not changed. The optical sheet holding parts 134b to 134d are formed in the same shape and same dimension as the optical sheet holding part 134a.

Meanwhile, the through holes 151b corresponding to the optical sheet holding parts 134b to 134d are formed to have gradually increased cross-sectional areas. The through hole 151b corresponding to the optical sheet holding part 134b is formed to have a cross-sectional area larger than the through hole 151b corresponding to the optical sheet holding part 134a. Further, the through hole 151b corresponding to the optical sheet holding part 134c is formed to have a cross-sectional area larger than the same. The through hole 151b corresponding to the optical sheet holding part 134d is formed to have a cross-sectional area larger than the same.

By configuring as described above, even when the optical sheet holding parts have substantially the same cross-sectional area as each other, the through holes 151b corresponding thereto have hole sizes increased in the sequence of engaging the optical sheet holding parts. Thereby, even if the dimensional error is large, it is possible to easily assemble the first diffusion sheet 151.

As a modified example of Embodiment 3, the following configuration may be considered. In FIG. 10, all the optical sheet holding parts 134b to 134g have different shapes and dimensions from each other. By changing the same, all the optical sheet holding parts 134c to 134g are formed in substantially the same shape as the optical sheet holding part 134b.

Meanwhile, the cross-sectional areas of the through holes 151b are changed. The through hole 151b corresponding to the optical sheet holding part 134a is formed to have the smallest cross-sectional area, and the through hole 151b corresponding to the optical sheet holding part 134b is formed to have the largest or larger cross-sectional area than the smallest cross-sectional area. Further, the through hole 151b corresponding to the optical sheet holding part 134c is formed to have a cross-sectional area larger than the same. By forming the through holes 151b to have gradually increased cross-sectional areas, the through hole 151b corresponding to the optical sheet holding part 134g is formed to have the largest cross-sectional area.

By configuring as described above, even when the optical sheet holding parts have the same cross-sectional area as each other, the through holes 151b corresponding thereto have hole sizes increased in the sequence of engaging the optical sheet holding parts. Thereby, even if the dimensional error is large, it is possible to easily assemble the first diffusion sheet 151.

As another modified example of Embodiment 3, the following configuration may be considered. In FIG. 10, all the optical sheet holding parts 134b to 134g have substantially the same shape as the optical sheet holding part 134a.

Meanwhile, the cross-sectional areas of the through holes 151b are changed. The through hole 151b corresponding to the optical sheet holding part 134a is formed to have the smallest cross-sectional area, and the through holes 151b corresponding to the optical sheet holding parts 134b, 134c, . . . and 134g are formed to have cross-sectional areas sequentially increased in this order. The through hole 151b corresponding to the optical sheet holding part 134g is formed to have the largest cross-sectional area.

By configuring as described above, even if the dimensional error is large, it is possible to easily assemble the first diffusion sheet 151.

As illustrated in the modified examples of Embodiments 1 to 3, even if the dimensional error is large, in order to make it possible to easily assemble the first diffusion sheet 151, it may be formed so that a difference between the cross-sectional area of the optical sheet holding part and the cross-sectional area of the through hole 151b is increased in an assembling sequence. As a method of achieving the above, there are a method of sequentially decreasing the cross-sectional areas of the optical sheet holding parts, and a method of sequentially increasing the cross-sectional areas of the optical sheet holding parts. Also, there is a method of changing the cross-sectional areas of both of the optical sheet holding parts and the through hole 151b.

Further, how to determine a suitable ratio of sequentially changing the cross-sectional areas is a matter of appropriately designing by considering the expected dimensional error, positioning accuracy or the like.

Meanwhile, the numbers of the optical sheet holding parts and the through holes 151b are the same as each other, but it is not limited thereto. The through hole 151b which is not engaged to the optical sheet holding part may be provided, or the optical sheet holding part to which through hole 151b is not engaged may be provided.

All the above-described methods of assembling the optical sheet are the case of applying to an edge light type backlight, but it is not limited thereto, and it is possible to apply to a direct type backlight. The direct type backlight is a backlight in which the light sources are disposed on the bottom of the backlight chassis whose one surface is opened, and a diffusion plate and optical sheet are laminated thereon. In the edge light type, the backlight chassis corresponds to the above-described back housing part 13, and the diffusion plate corresponds to the light guide plate 11. Accordingly, as a method of assembling the optical sheet to the backlight chassis, the above-described methods of Embodiments 1 to 3 may be employed.

Technical characteristics (configuration requirements) described in each embodiment may be combined with each other, and new technical characteristics may be formed by combining the same.

It should be understood that the embodiments disclosed herein are illustrative and non-restrictive in every respect. Since the scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A lighting device comprising:
a light guide plate;
an optical sheet configured to diffuse or collect light emitted from the light guide plate;
a plurality of hole parts formed in the optical sheet;
a housing part formed in a box shape in which one surface thereof has an opening portion, and at least one side of the edge sides of a surface facing the opening portion is a linear shape,
wherein the light guide plate and the optical sheet are laminated and housed in the housing part; and
a plurality of holding parts which are provided along the linear edge side in the housing part respectively corresponding to the plurality of hole parts to support the optical sheet in the housing part so as to penetrate the corresponding respective hole parts, and are configured so that cross sections thereof parallel to the optical sheet have areas smaller than the cross-sectional areas of the hole parts,
wherein a part of the holding parts has an area of cross section which is different from the areas of the cross sections of the other holding parts; and a difference between the area of the cross sections and the cross-sectional areas of the hole parts corresponding thereto is not constant, and some of the cross-sectional areas of the plurality of the holding parts include those that differ from the other cross-sectional area of the holding part,
wherein the holding part provided near a center of the edge side has the largest cross-sectional area.

2. The lighting device according to claim 1, wherein cross sections of the holding parts are rectangular shape.

3. The lighting device according to claim 1, wherein the holding part having the largest area among the plurality of holding parts has a rectangular cross section, and the other holding parts have a triangular cross section.

4. The lighting device according to claim 1,
wherein the hole part corresponding to the holding part provided near the center of the edge side has the smallest cross-sectional area.

5. The lighting device according to claim 1,
a difference between the cross-sectional area of the hole part corresponding to the holding part provided near the center of the edge side and the areas of the cross sections of the holding parts is smallest.

6. A display apparatus comprising:
the lighting device according to claim 1, and
a display panel which faces the one surface of the light guide plate, and displays an image using light which enter through the light guide plate.

7. A lighting device comprising:
a light guide plate;
an optical sheet configured to diffuse or collect light emitted from the light guide plate;
a plurality of hole parts formed in the optical sheet;
a housing part formed in a box shape in which one surface thereof has an opening portion, and at least one side of the edge sides of a surface facing the opening portion is a linear shape,
wherein the light guide plate and the optical sheet are laminated and housed in the housing part; and
a plurality of holding parts are provided along the linear edge side in the housing part respectively corresponding to the plurality of hole parts to support the optical sheet in the housing part so as to penetrate the corresponding respective hole parts, and are configured so that cross sections thereof parallel to the optical sheet have areas smaller than the cross-sectional areas of the hole parts,
wherein a part of the holding parts has an area of cross section which is different from the areas of the cross sections of the other holding parts, and a difference between the area of the cross sections and the cross-sectional areas of the hole parts corresponding thereto is not constant, and some of the cross-sectional areas of the plurality of the holding parts include those that differ from the other cross-sectional area of the holding part,
wherein the holding part provided near one end of the edge side has the largest cross-sectional area.

8. The lighting device according to claim 7,
wherein the hole part corresponding to the holding part provided near the one end of the edge side has the smallest cross-sectional area.

9. The lighting device according to claim 7,
wherein a difference between the cross-sectional area of the hole part corresponding to the holding part provided near the one end of the edge side and the areas of the cross sections of the holding parts is smallest.

10. The lighting device according to claim 7, wherein cross sections of the holding parts are rectangular shape.

11. The lighting device according to claim 7, wherein the holding part having the largest area among the plurality of holding parts has a rectangular cross section, and the other holding parts have a triangular cross section.

12. A display apparatus comprising:
    the lighting device according to claim 7, and
    a display panel which faces the one surface of the light guide plate, and displays an image using light which enter through the light guide plate.

* * * * *